(12) United States Patent
Mulford

(10) Patent No.: US 8,973,433 B2
(45) Date of Patent: Mar. 10, 2015

(54) DUAL DIFFERENTIAL PRESSURE MULTIPHASE FLOW METER

(75) Inventor: Harlan Michael James Mulford, Al Khobar (SA)

(73) Assignee: Baker Hughes Incorporated, Houston, TX (US)

(*) Notice: Subject to any disclaimer, the term of this patent is extended or adjusted under 35 U.S.C. 154(b) by 304 days.

(21) Appl. No.: 13/487,803

(22) Filed: Jun. 4, 2012

(65) Prior Publication Data

US 2013/0319103 A1 Dec. 5, 2013

(51) Int. Cl.
*E21B 47/10* (2012.01)
*G01F 1/58* (2006.01)

(52) U.S. Cl.
CPC ............. *E21B 47/10* (2013.01); *G01F 1/588* (2013.01)
USPC ...................................... 73/152.29

(58) Field of Classification Search
CPC ........ E21B 47/10; E21B 47/102; G01F 1/588
USPC ...................................... 73/152.29
See application file for complete search history.

(56) References Cited

U.S. PATENT DOCUMENTS

| | | | |
|---|---|---|---|
| 5,736,650 A | 4/1998 | Hiron et al. | |
| 6,345,536 B1* | 2/2002 | Morrison et al. | 73/861.04 |
| 6,935,189 B2* | 8/2005 | Richards | 73/861.04 |
| 6,945,095 B2* | 9/2005 | Johansen | 73/61.45 |
| 7,107,860 B2* | 9/2006 | Jones | 73/861.63 |
| 7,281,415 B2* | 10/2007 | Johansen | 73/61.45 |
| 7,707,897 B2* | 5/2010 | Ong | 73/861.04 |
| 7,836,973 B2* | 11/2010 | Belcher et al. | 175/25 |
| 8,122,975 B2* | 2/2012 | Belcher et al. | 175/57 |
| 2002/0069022 A1* | 6/2002 | Fincke | 702/45 |

OTHER PUBLICATIONS

International Search Report and Written Opinion dated Aug. 12, 2013 for International Application No. PCT/US2013/038182.

\* cited by examiner

*Primary Examiner* — Hezron E Williams
*Assistant Examiner* — Rodney T Frank
(74) *Attorney, Agent, or Firm* — Cantor Colburn LLP

(57) ABSTRACT

A flow meter and method of determining a parameter of a downhole multiphase fluid is disclosed. Multiphase fluid flows through a downhole tubular member having first section, second section and third section, wherein the second section is disposed between the first section and the third section and an inner diameter of the second section is greater than an inner diameter of the first section and an inner diameter of the third section. Absolute pressure measurements of the multiphase fluid are obtained at each of the first section, second section and third section using absolute pressure gauges. The parameter of the downhole multiphase fluid is determined from the absolute pressure measurements.

18 Claims, 3 Drawing Sheets

US 8,973,433 B2

DUAL DIFFERENTIAL PRESSURE MULTIPHASE FLOW METER

BACKGROUND OF THE DISCLOSURE

1. Field of the Disclosure

The present disclosure relates in general to wellbore fluid production and more particularly to a method of determining a fluid flow rate for a multiphase fluid from a production zone.

2. Description of the Related Art

Flow meters are often used for measuring flow of fluid produced from a hydrocarbon-producing wellbore. The flow meters may be deployed downhole within a producing wellbore or in a production transmission line used in distributing the produced fluids. The produced fluid may include water and/or gas mixed with liquid hydrocarbon. It is generally desired to determine various parameters of the multiphase fluid, such as phase flow rate, water cut, gas-oil ratio, etc. Flow meters may be employed that provide information regarding total flow, water cut amount, and gas fractions. Typically, these flow meters include pipes having a regions of constricted flow which slow the overall production rate from the wellbore. Thus, there is a need to provide a multiphase flow meter using full bore, or non-restrictive, pipe flow.

SUMMARY OF THE DISCLOSURE

In one aspect, the present disclosure provides a method of determining a parameter of a downhole multiphase fluid that includes: flowing the multiphase fluid through a downhole tubular member having a first section, second section and third section, wherein the second section is disposed between the first section and the third section and an inner diameter of the second section is greater than an inner diameter of the first section and an inner diameter of the third section; measuring an absolute pressure of the multiphase fluid at each of the first section, second section and third section using absolute pressure gauges; and determining the parameter of the downhole multiphase fluid from the absolute pressure measurements.

In another aspect, the present disclosure provides a flow meter that includes: a tubular member disposed downhole, the tubular member having a first section, second section and third section, wherein the second section is disposed between the first section and the third section and an inner diameter of the second section is greater than an inner diameter of the first section and the third section; absolute pressure gauges configured to measure absolute pressures at each of the first section, second section and third section; and a processor configured to determine a parameter of multiphase fluid flowing through the downhole tubular member using the absolute pressure measurements of the multiphase fluid obtained at the absolute pressure gauges.

In yet another embodiment, the present disclosure provides a flow meter system for determining a parameter of a multiphase fluid, the flow meter system including: a first flow meter disposed in a tubular member that provides a flow of the multiphase fluid; a second flow meter disposed in the tubular member downstream of the first flow meter, wherein each of the first flow meter and the second flow meter includes: a first section, second section and third section, wherein the second section is disposed between the first section and the third section and an inner diameter of the second section is greater than the inner diameters of the first section and of the third section, and absolute pressure gauges configured to measure absolute pressures at each of the first section, second section and third section of the first and second flow meters; and a processor configured to determine a parameter of the multiphase fluid using absolute pressure measurements of the multiphase fluid obtained at the absolute pressure gauges.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

BRIEF DESCRIPTION OF THE DRAWINGS

For detailed understanding of the present disclosure, references should be made to the following detailed description, taken in conjunction with the accompanying drawings, in which like elements have been given like numerals and wherein.

DETAILED DESCRIPTION OF THE DISCLOSURE

Figure 1:
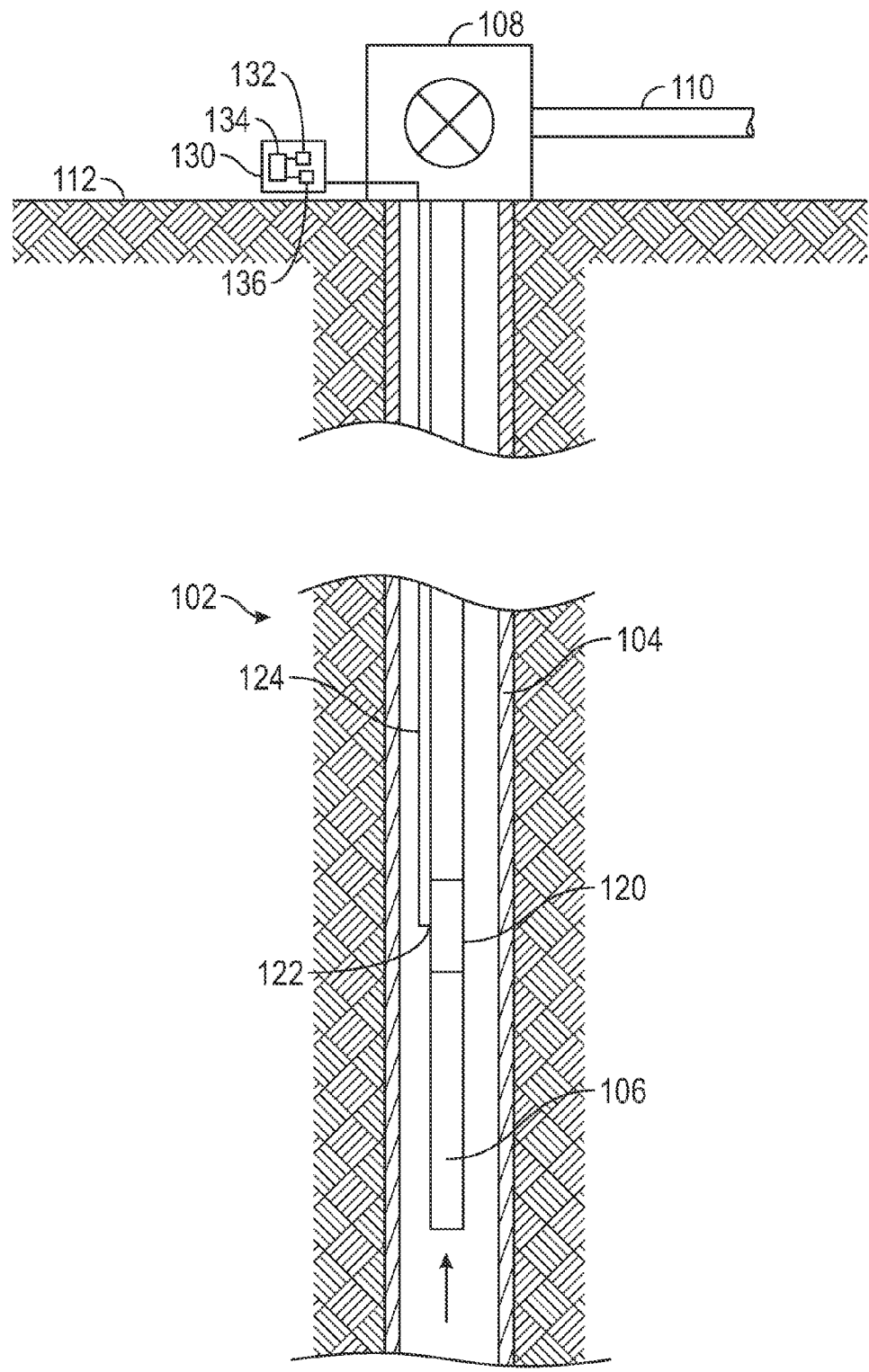
FIG. 1 shows an exemplary completion string suitable for flow of a production fluid from a downhole production zone to a surface location in an exemplary embodiment of the present disclosure.

FIG. 1 shows an exemplary completion string 100 suitable for flow of a production fluid from a downhole production zone to a surface location in an exemplary embodiment of the present disclosure. A wellbore 102 is lined with casing 104 and a production tubing 106 is disposed within the wellbore 102. The production tubing 106 receives fluids produced from the wellbore 102 and delivers the produced fluids to a wellhead assembly 108. Typically the production fluid is a multiphase fluid that includes, for example, hydrocarbons, gases and water in various phases. The wellhead assembly 108 is located at a surface location 112 and is generally seated on top of the wellbore 102. The wellhead assembly 108 is attached to a production line 110 for distributing the produced fluid to a location for further processing. An exemplary flow meter 120 is provided within the production tubing 106 at a downhole location. In alternate embodiments, the exemplary flow meter 120 may be disposed in any suitable tubing, such as production line 110. An instrument tap 122 is shown inserted into the exemplary flow meter 120. The instrument tap 122 may include a pressure gauge connected to a communication line 124 configured to transmit data obtained from the pressure gauge to a surface controller 130. The instrument tap 122 may include multiple instrument taps with one or more communication lines attached for delivering data to the surface controller 130. In an alternate embodiment, through-tubing communication may be used for delivering data to the surface controller 130.

In various aspects, surface controller 130 includes at least one memory 132 having various programs and data stored therein, a computer or processor 134 accessible to the memory and configured to access one or more of the programs and/or data stored therein to perform various methods of the present disclosure to obtain a parameter of interest from the data obtained from the flow meter 120, and a recording medium 126 for recording and storing the obtained parameter of interest. The parameter of interest may include, but is not limited to, a selected a total flow rate, a gas volume fraction, a liquid volume fraction, a density of the multiphase fluid, a gas flow rate, a liquid flow rate, an oil flow rate and a water cut. The surface controller 130 may output various data, such as the obtained parameter of interest, to various devices, such as a display 138. In alternate embodiments, the surface controller may control an aspect of the fluid production such as production rate, an injection rate, etc., using the determined parameter of interest. Although a surface processor 130 is shown in the exemplary embodiment of FIG. 1, the processor may alternatively be disposed at a downhole location.

Figure 2:
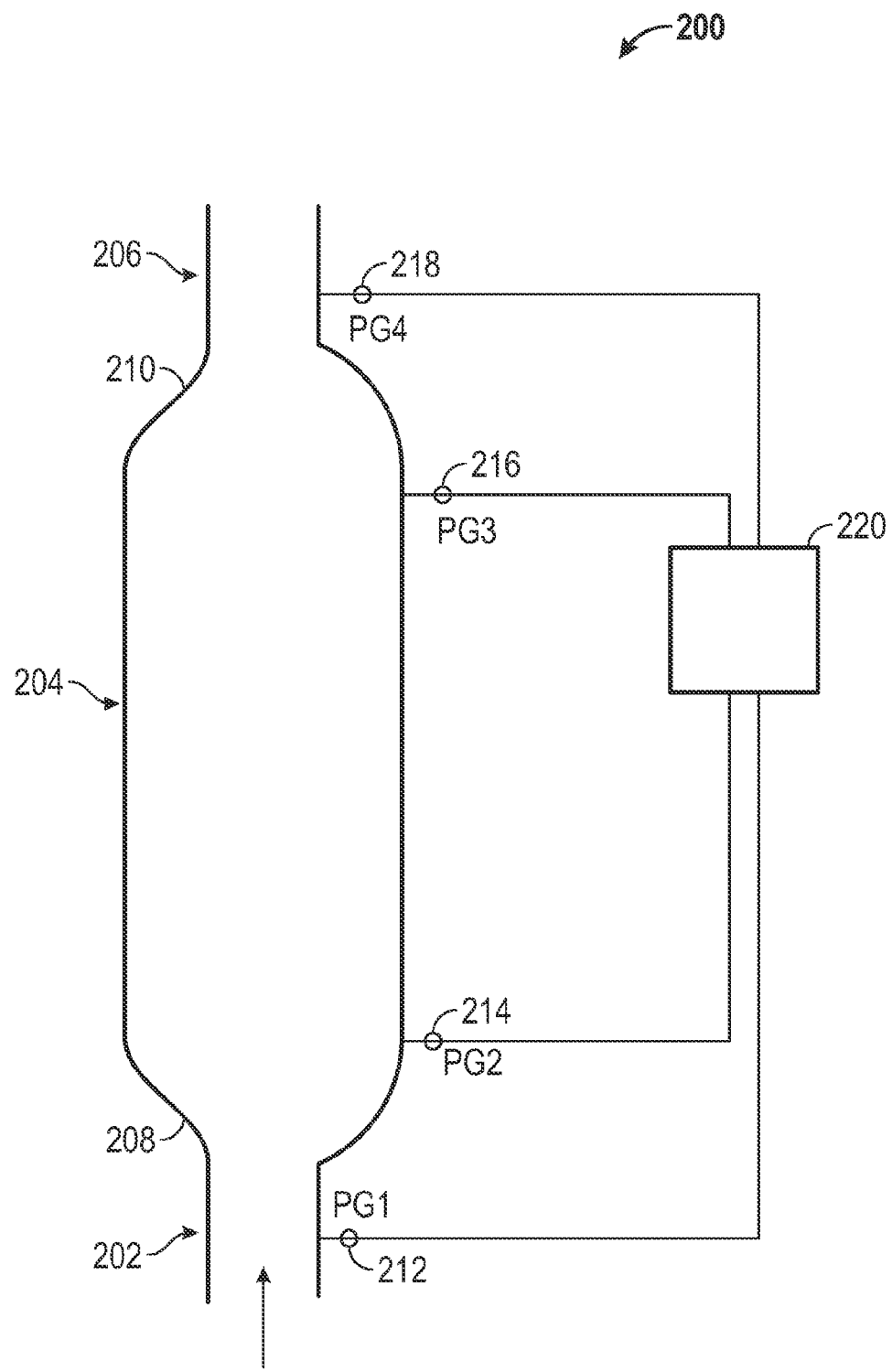
FIG. 2 show an exemplary flow meter for determining a flow rate of a selected phase of a multiphase fluid in one embodiment of the present disclosure.

FIG. 2 shows an exemplary flow meter 200 for determining the parameter of a downhole multiphase fluid in one embodiment of the present disclosure. The parameter may be a parameter of a selected phase of the downhole multiphase fluid. The exemplary flow meter includes a tubular member having a first section 202, a second section 204 and a third section 206. For illustrative purposes, fluid flow 201 is in a direction from the first section 202 to the third section 206, however the flow meter may also be operated with fluid flowing in the opposite direction. The first section 202 is coupled to an upstream section of the production tubing 106 and the third section 206 is coupled to a downstream section of the production tubing 106. The first section 202 and third section 206 of the tubular member may have different inner diameters. However, in an exemplary embodiment, the inner diameter of the first section 202 is substantially the same as the inner diameter of the third section 206. The second section 204 of the tubular member is disposed between the first and third section, and the inner diameter of the second section is greater than the inner diameters of the first section and the third section. Diverging section 208 couples the first section 202 to the second section 204 and converging section 210 couples the second section 204 to the third section 206.

Each of sections 202, 204 and 206 includes at least one absolute pressure gauge for measuring an absolute pressure of the multiphase fluid in the associated section. Exemplary absolute pressure gauge (PG1) 212 is located in the first section 202 proximate the diverging section 208. Absolute pressure gauge (PG2) 214 is located in the second section 204 proximate the diverging section 208. Absolute pressure gauge (PG3) 216 is located in the second section 204 proximate the converging section 210, and absolute pressure gauge (PG4) 218 is located in the third section 206 proximate the converging section 210. The pressure gauges 212, 214, 216 and 218 provide measurements of absolute pressure to the exemplary processor 220. The processor 220 may determine pressure differences between any of the pressure gauges using the obtained absolute pressure measurements. In an exemplary embodiment, the processor 220 may determine pressure differences between pressure gauges 212 and 218 at opposite ends of the flow meter 200. In one embodiment, a pressure gauge may be disposed at a distal location upstream of the exemplary flow meter 200. The use of absolute pressure gauges enables use of the flow meter downhole under downhole pressure and temperatures. The absolute pressure gauges PG1-PG4 are used rather than differential pressure gauges which are generally susceptible to failure under downhole pressures and temperatures. In another embodiment, an absolute pressure gauge may be disposed at a distal location downstream of the exemplary flow meter 200. In yet another embodiment, an absolute pressure gauge may be disposed at a distal location upstream of the exemplary flow meter 200 and another absolute pressure gauge may be disposed at a distal location downstream.

In one embodiment, the flow meter may be used to determine a total flow rate of the multiphase fluid. In an exemplary embodiment, the multiphase fluid includes a mixture of liquid and gas. Total flow rate and gas volume fraction (GVF) may be determined from the absolute pressure measurements. Gas flow rate may then be determined as a product of the gas volume fraction and the total flow rate. The GVF of the multiphase fluid flowing through the flow meter may be estimated based on a ratio of pressure differentials that are calculated from the absolute pressure measurements obtained at the flow meter. In one embodiment, determining the GVF includes measuring differential pressure between the first section and the third section.

A total density of the liquid-gas mixture may be determined using a difference in pressure measurements obtained at separated vertical depths. Gas density may also be determined and liquid density may be determined from Eqs. (1)-(3):

$$\rho_{Total} = GVF * \rho_{gas} + (1 - GVF) * \rho_{liquid} \quad \text{Eq. (1)}$$

$$\rho_{Total} = GVF * \rho_{gas} + LVF * \rho_{liquid} \quad \text{Eq. (2)}$$

$$\rho_{liquid} = \frac{\rho_{Total} - GVF * \rho_{gas}}{LVF} = \frac{\rho_{Total} - GVF * \rho_{gas}}{1 - GVF} \quad \text{Eq. (3)}$$

wherein $\rho_{Total}$ is the total density obtained using the absolute pressure measurements, $\rho_{gas}$ is the density of gas in the multiphase fluid and $\rho_{liquid}$ is the density of liquid in the multiphase fluid. In various embodiments, the multiphase fluid includes a gaseous and liquid phase. Water Cut (WC) may then be determined using the determined total density and standard density values for water and oil, as shown in Eq. (4):

$$WC = \frac{(\rho_{liquid} - \rho_O)}{(\rho_W - \rho_O)} \quad \text{Eq. (4)}$$

wherein $\rho_O$ is an oil density value and $\rho_W$ is a water density value. The oil density value and water density value may be standard density value but are more often density values obtained from fluid samples and may be described a function of pressure and temperature using correlations or a polynomial function. For example the density of water is 65 lb/ft$^3$ at 100° F. and 100 psi and is 64.8 lb/ft$^3$ at 80° F. at 1000 psi. Water flow rate and oil flow rate may then be determined using a measured total flow rate and Eqs. (5)-(8):

(liquid flow rate)=(1−GVF)*(total flow rate)     Eq. (5)

(gas flow rate)=GVF*(total flow rate)     Eq. (6)

Water flow rate=WC*(liquid flow rate)     Eq. (7)

Oil flow rate=(1−WC)*(liquid flow rate)     Eq. (8)

Figure 3:
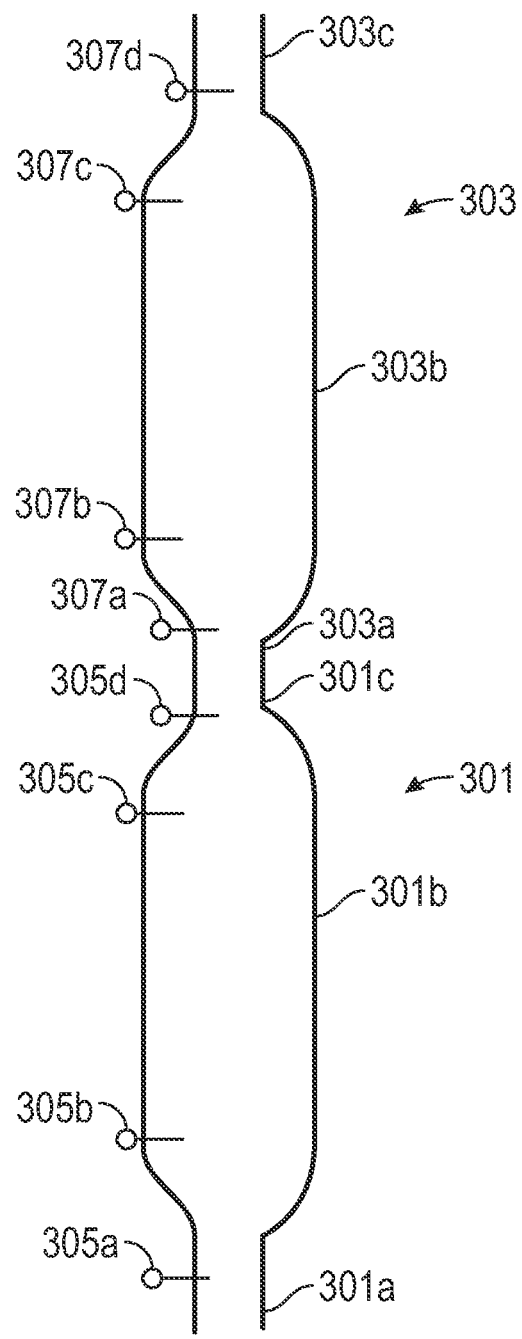
FIG. 3 shows an exemplary flow meter system for determining a flow rate of a selected phase of a multiphase fluid in one embodiment of the present disclosure.

FIG. 3 shows an exemplary flow meter system 300 for determining a flow rate of a selected phase of a multiphase fluid in one embodiment of the present disclosure. The exemplary flow meter system 300 includes a first flow meter 301 and a second flow meter 303 downstream of the first flow meter 301. The first flow meter 301 includes a tubular member having a first section 301a, a second section 301b, and a third section 301c, wherein the second section 301b is disposed between the first section 301a and the third section 301c and has a second inner diameter that is greater than the inner diameter of the first section 301a and the inner diameter of the third section 301c. The second flow meter 303 includes a first section 303a, a second section 303b, and a third section 303c of the tubular member, wherein the second section 303b is disposed between the first section 303a and the third section 303c and has a second inner diameter that is greater than the inner diameter of the first section 303a and the inner diameter of the third section 303c. In one embodiment, second inner diameter 301b of the first flow meter 301 is substantially the same as the second inner diameter 303b of the second flow meter 303. In alternate embodiments, the second inner diameter 303b of the second flow meter 303 is greater than the second inner diameter 301b of the first flow meter 301.

Absolute pressure gauges 305a-d are disposed in the first flow meter 301 at locations similar to the locations of pressure gauges 212, 214, 216 and 218 of the exemplary flow meter 200. Absolute pressure gauges 307a-d are similarly disposed in the second flow meter 303. In the exemplary system 300, third section 301c of the first flow meter 301 is the same as the first section 303a of the second flow meter 303. Therefore, in various embodiments, the pressure gauge 305d and the pressure gauge 307a may be a single gauge. In addition, in various embodiments, pressure gauges 305b and 305c may be replaced by a single absolute pressure gauge in the second section 301b, and absolute pressure gauges 307b and 307c may be replaced by a single absolute pressure gauge in the second section 303b.

Therefore, in one aspect the present disclosure provides a method of determining a parameter of a downhole multiphase fluid that includes: flowing the multiphase fluid through a downhole tubular member having a first section, second section and third section, wherein the second section is disposed between the first section and the third section and an inner diameter of the second section is greater than an inner diameter of the first section and an inner diameter of the third section; measuring an absolute pressure of the multiphase fluid at each of the first section, second section and third section using absolute pressure gauges; and determining the parameter of the downhole multiphase fluid from the absolute pressure measurements. In one embodiment, the parameter is a volumetric flow rate and is determined using a difference between the absolute pressure measurements obtained at the first section and the third section. In various embodiments, the absolute pressure is measured in the second section at a location that is one of an interface between the first section and the second section and an interface between the second section and the third section. Additionally, pressure may be measured at a pressure gauge located at a location distal from the first flow meter section at one of: (i) upstream of the first flow meter; (ii) downstream of the first flow meter; and (iii) one upstream and one downstream of the first flow meter. In an additional embodiment, a second flow meter may be downstream of the first flow meter, wherein the second flow meter includes a tubular member having a first section, second section and third section, wherein the second section is disposed between the first section and third section and the inner diameter of the second section is greater that the inner diameter of the first section and the inner diameter of the third section. The inner diameter of the second section of the second flow meter may be substantially the same as the inner diameter of the second section of the first flow meter or less than the inner diameter of the second section of the first flow meter, in various embodiments. The multiphase fluid is generally a production fluid from a subterranean production zone and the tubular member is an element of a completion string. The parameter of the downhole multiphase may be one of: (i) a total flow rate; (ii) a gas volume fraction; (iii) a liquid volume fraction; (iv) a density of the multiphase fluid; (v) a gas flow rate; (vi) a liquid flow rate; (vii) a water flow rate; (viii) an oil flow rate; and (ix) a water cut.

In another aspect, the present disclosure provides a flow meter that includes: a tubular member disposed downhole, the tubular member having a first section, second section and third section, wherein the second section is disposed between the first section and the third section and an inner diameter of the second section is greater than an inner diameter of the first section and the third section; absolute pressure gauges configured to measure absolute pressures at each of the first section, second section and third section; and a processor configured to determine a parameter of multiphase fluid flowing through the downhole tubular member using the absolute pressure measurements of the multiphase fluid obtained at the absolute pressure gauges. In one embodiment, the parameter of the multiphase fluid is volumetric flow rate and the processor determines the volumetric flow rate of a selected phase of the multiphase fluid using a difference between the absolute pressure measurements obtained from the first section and the third section. In various embodiments, the parameter may be (i) a total flow rate; (ii) a gas volume fraction; (iii) a liquid volume fraction; (iv) a density of the multiphase fluid; (v) a gas flow rate; (vi) a liquid flow rate; (vii) a water flow rate; (viii) an oil flow rate; and (ix) a water cut. The absolute pressure gauge of the second section may include one of an absolute pressure gauge disposed in the second section at an interface between the first section and the second section; and an absolute pressure gauge disposed in the second section at an interface between the second section and the third section. At least one pressure gauge may be located distal from the flow meter, wherein the at least one pressure gauge is one of: (i) a pressure gauge located upstream of the flow meter; (ii) a pressure gauge located downstream of the flow meter; and (iii) one pressure gauge upstream and one pressure gauge downstream of the flow meter. In various embodiments, the multiphase fluid is a production fluid from a production zone and the flow meter is an element of a completion string that provides flow of the production fluid from the production zone. In one embodiment, the inner diameter of the first section is substantially the same as the inner diameter of the third section.

In yet another embodiment, the present disclosure provides a flow meter system for determining a parameter of a multiphase fluid, the flow meter system including: a first flow meter disposed in a tubular member that provides a flow of the multiphase fluid; a second flow meter disposed in the tubular member downstream of the first flow meter, wherein each of the first flow meter and the second flow meter includes: a first section, second section and third section, wherein the second section is disposed between the first section and the third section and an inner diameter of the second section is greater than the inner diameters of the first section and of the third section, and absolute pressure gauges configured to measure absolute pressures at each of the first section, second section and third section of the first and second flow meters; and a processor configured to determine a parameter of the multiphase fluid using absolute pressure measurements of the multiphase fluid obtained at the absolute pressure gauges. The inner diameter of the second section of the second flow meter may be substantially the same as the inner diameter of the second section of the first flow meter or less than the inner diameter of the second section of the first flow meter, in various embodiments. The parameter may be one of: (i) a total flow rate; (ii) a gas volume fraction; (iii) a liquid volume fraction; (iv) a density of the multiphase fluid; (v) a gas flow rate; (vi) a liquid flow rate; (vii) a water flow rate; (viii) an oil flow rate; and (ix) a water cut.

While the foregoing disclosure is directed to the certain exemplary embodiments of the disclosure, various modifications will be apparent to those skilled in the art. It is intended that all variations within the scope and spirit of the appended claims be embraced by the foregoing disclosure.

What is claimed is:

1. A method of determining a gas volume fraction of a downhole multiphase fluid, comprising:
flowing the multiphase fluid through a downhole tubular member having a first section, second section and third section, wherein the second section is disposed between the first section and the third section and an inner diameter of the second section is greater than an inner diameter of the first section and an inner diameter of the third section;
measuring an absolute pressure of the multiphase fluid at each of the first section, second section and third section using absolute pressure gauges; and
determining the gas volume fraction of the downhole multiphase fluid from the absolute pressure measurements using a difference in an absolute pressure measurement obtained at the first section and an absolute pressure measurement obtained at the third section.

2. The method of claim 1, further comprising determining the volumetric flow rate of a phase of the multiphase fluid using a difference between the absolute pressure measurements obtained at the first section and the third section.

3. The method of claim 1, further comprising measuring the absolute pressure in the second section at a location selected from a group consisting of: (i) an interface between the first section and the second section; and (ii) an interface between the second section and the third section.

4. The method of claim 1, further comprising measuring a pressure at a pressure gauge at a location distal from the first flow meter section at one of: (i) upstream of the first flow meter; (ii) downstream of the first flow meter; and (iii) one upstream and one downstream of the first flow meter.

5. The method of claim 1, further comprising a second flow meter downstream of the first flow meter, wherein the second flow meter includes a tubular member having a first section, second section and third section, wherein the second section is disposed between the first section and third section and the inner diameter of the second section is greater that the inner diameter of the first section and the inner diameter of the third section.

6. The method of claim 5, wherein the inner diameter of the second section of the second flow meter is one of: (i) substantially the same as the inner diameter of the second section of the first flow meter; and (ii) less than the inner diameter of the second section of the first flow meter.

7. The method of claim 1, wherein the multiphase fluid is a production fluid from a subterranean production zone and the tubular member is an element of a completion string.

8. The method of claim 1, further comprising using the absolute pressure measurements to determine at least one of: (i) a total flow rate; (ii) a liquid volume fraction; (iii) a density of the multiphase fluid; (iv) a gas flow rate; (v) a liquid flow rate; (vi) a water flow rate; (vii) an oil flow rate; and (viii) a water cut.

9. A flow meter, comprising:
a tubular member disposed downhole, the tubular member having a first section, second section and third section, wherein the second section is disposed between the first section and the third section and an inner diameter of the second section is greater than an inner diameter of the first section and the third section;
absolute pressure gauges configured to measure absolute pressures at each of the first section, second section and third section; and
a processor configured to determine a gas volume fraction of a multiphase fluid flowing through the downhole tubular member using a difference in absolute pressure measurements of the multiphase fluid obtained at the first section and the third section.

10. The flow meter of claim 9, further comprising determining a volumetric flow rate of a selected phase of the multiphase fluid using a difference between the absolute pressure measurements obtained from the first section and the third section.

11. The flow meter of claim 9, further comprising using the absolute pressure measurements to determine at least one of (i) a total flow rate; (ii) a liquid volume fraction; (iii) a density of the multiphase fluid; (iv) a gas flow rate; (v) a liquid flow rate; (vi) a water flow rate; (vii) an oil flow rate; and (viii) a water cut.

12. The flow meter of claim 9, wherein the absolute pressure gauge of the second section further comprises at least one of: (i) an absolute pressure gauge disposed in the second section at an interface between the first section and the second section; and (ii) an absolute pressure gauge disposed in the second section at an interface between the second section and the third section.

13. The flow meter of claim 9, further comprising at least one pressure gauge located distal from the flow meter, wherein the at least one pressure gauge is one of: (i) a pressure gauge located upstream of the flow meter; (ii) a pressure gauge located downstream of the flow meter; and (i) one pressure gauge upstream and one pressure gauge downstream of the flow meter.

14. The flow meter of claim 9, wherein the multiphase fluid is a production fluid from a production zone and the flow meter is an element of a completion string that provides flow of the production fluid from the production zone.

15. The flow meter of claim 9, wherein the inner diameter of the first section is substantially the same as the inner diameter of the third section.

16. A flow meter system for determining a gas volume fraction of a multiphase fluid, comprising:
a first flow meter disposed in a tubular member that provides a flow of the multiphase fluid;
a second flow meter disposed in the tubular member downstream of the first flow meter, wherein each of the first flow meter and the second flow meter includes:
a first section, second section and third section, wherein the second section is disposed between the first section and the third section and an inner diameter of the second section is greater the inner diameters of the first section and of the third section, and
absolute pressure gauges configured to measure absolute pressures at each of the first section, second section and third section of the first and second flow meters; and
a processor configured to determine the gas volume fraction of the multiphase fluid using a difference in absolute pressure measurements of the multiphase fluid obtained at the first section and the third section.

17. The flow meter system of claim 16, wherein the inner diameter of the second section of the second flow meter is one of: (i) substantially the same as the inner diameter of the second section of the first flow meter; and (ii) less than the inner diameter of the second section of the first flow meter.

18. The flow meter system of claim 16, further comprising using the absolute pressure measurements to determine at least one of (i) a total flow rate; (ii) a liquid volume fraction;

(iii) a density of the multiphase fluid; (iv) a gas flow rate; (v) a liquid flow rate; (vi) a water flow rate; (vii) an oil flow rate; and (viii) a water cut.

* * * * *